Figure 1:
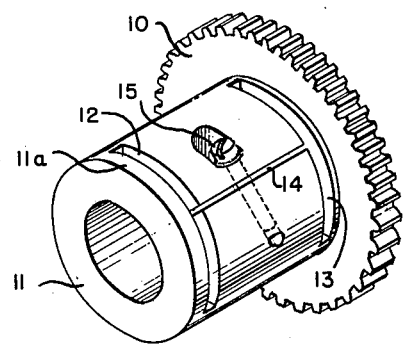

June 30, 1964　　　S. I. GREENE　　　3,139,296

CLAMPABLE PRECISION GEAR

Filed April 9, 1962

United States Patent Office 3,139,296
Patented June 30, 1964

3,139,296
CLAMPABLE PRECISION GEAR
Sanford I. Greene, 223 Duck Pond Drive S.,
Wantagh, N.Y.
Filed Apr. 9, 1962, Ser. No. 186,214
1 Claim. (Cl. 287—52)

This invention relates to clampable precision gears adapted to be secured for securing the gear to a shaft in any desired angular position.

The age-old problem of securing gears, pulleys, and the like to a shaft has been accentuated in recent years by the growth of precision mechanical computers utilizing complex gear assemblies each of the gears of which must be secured to its shaft rigidly in any desired angular position, such setting frequently being required to be made after assembly. Further, such assemblies frequently operate at extremely high speeds so that it becomes important that the gears be dynamically balanced.

Up to the present time, the precison gear art has substantially narrowed down to two types, the pin type and the clamp type. In the pin-type gear, the gear has an integral hub with a diametral hole registering with a hole in the shaft and a pin is driven through the hub and the shaft to secure them together. While this type of gear is satisfactory for some applications, it has the disadvantages that the gear can be secured in only a predetermined angular position or positions and that the force required to drive the setting pin is such that the gear usually cannot be secured to its shaft after assembly in a gear train. This type of gear is thus limited to a preassembly of each gear and its shaft, thus seriously restricting the scope of its application.

In the clamp-type gear, there is provided an integral hub, slotted along axial planes usually 90° apart, and there is provided a split annular clamp which is slipped over the slotted hub and tightened. This type of gear has the advantage that it may be secured to a shaft in any desired angular position and that it can be secured to the shaft after assembly in a gear train. However, it has a number of serious disadvantages, among which may be mentioned the fact that the clamp effectively increases the size of the hub, which prevents its use in small, compact gear assemblies. In addition, the clamp has considerable weight and moment of inertia which give rise to large acceleration forces in high-speed gear trains. Furthermore, the clamp is usually constructed in unbalanced form, which may give rise to vibration in high-speed gearing. If provided with a balancing arm, the weight and moment of inertia, as well as cost, are correspondingly increased. In addition, only that portion of the hub lying within the gear web serves to guide the gear axially on its shaft so that the problem of axial alignment is unsolved. Also, due to the fact that the sectors of the slotted hub must be clamped, they must be fairly thin and resilient, thereby seriously reducing the strength and rigidity of the gear. Also, in many gears of this type, the angular positioning of the clamp relative to the positions of the hub slots is critical, increasing the difficulty of setting the gear after assembly. After a gear of this type has been adjusted and set in desired position, it is usually difficult, if not impossible, to secure it in such position by drilling and pinning it to the shaft. It has further been discovered that, in assembling complex gear trains, the assembler sometimes forgets to assemble the clamping ring with the gear, thus requiring complete disassembly of the gear train or the use of special expensive and cumbersome two-piece clamps. Moreover, gears of this type must be hobbed by "floating" them on an arbor with one face of the gear clamped to a reference shoulder. This involves certain errors arising from the mounting tolerances.

It is an object of the present invention, therefore, to provide a new and improved clampable precision gear which obviates one or more of the above-mentioned disadvantages of prior devices having clampable shaft collars.

While, as stated, the present invention is particularly suitable for embodiment as an integral part of a precision gear, it is understood that many of its advantages are realized also when the invention is applied to simple collars, hubbed pulleys, etc.

In accordance with the invention, there is provided a precision gear clampable in any desired angular position on a supporting shaft comprising a gear body and a cylindrical collar integral therewith, a continuous bore extending through the body and the collar, two longitudinally spaced transverse radial slots through a substantial portion of the collar, one adjacent the gear body, a longitudinal second slot through at least a portion of the collar and lying substantially in an axial plane thereof, such second slot extending between and intersecting the radial slots, and a clamping screw passing through a portion of the collar on one side of the longitudinal slot and threaded into a portion of the collar on the opposite side thereof for drawing together portions of the collar on opposite sides of the longitudinal slot.

For a better understanding of the present invention, together with other and further objects thereof, reference is had to the following description taken in connection with the accompanying drawing, while its scope will be pointed out in the appended claims.

Figure 2:
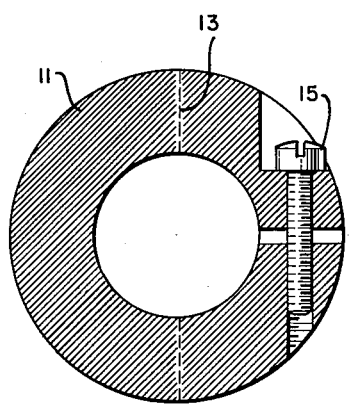

Referring now to the drawing:

FIG. 1 is a perspective view of a self-clamping shaft collar formed as an integral part of a precision gear and embodying the invention; while FIG. 2 is a cross-sectional view through the collar of FIG. 1.

Referring now to FIG. 1 of the drawing, there is illustrated a precision gear 10 including an integral clamping shaft collar embodying the invention. This collar comprises an integral annular sleeve 11 having at least one transverse radial slot through a substantial portion thereof and a longitudinal slot through one portion of the sleeve lying substantially in an axial plane thereof, such longitudinal slot terminating in the radial slot and substantially bisecting the same.

Specifically, the annular sleeve 11 is provided with two longitudinally spaced radial slots 12 and 13 extending through substantially one-half of the sleeve and a longitudinal slot 14 extending between the two radial slots 12 and 13 and substantially bisecting the same. The slot 12 leaves an annular portion 11a of the sleeve 11 unslotted to provide additional axial guidance. In some applications, it may be desirable that the longitudinal slot 14 intersect the slot 13 near one end thereof rather than bisecting it.

The sleeve 11 is also provided with means for drawing together portions thereof on opposite sides of the longitudinal slot 14. This means may be in the form of a clamping screw 15 passing through the upper portion of the sleeve on one side of the longitudinal slot 14 and threaded into the registering portion of the sleeve on the opposite side of the slot 14.

It is believed that the operation of the clampable precision gear of the invention will be apparent from the foregoing description. The gear 10 of FIG. 1 may be slipped onto its shaft in a conventional manner, adjusted to its proper position, and secured by tightening the screw 15. The unslotted portion of the sleeve 11 integral with, and within, the gear 10 and the unslotted end portion 11a have a considerable longitudinal spacing, thus ensuring accurate axial alignment between the gear 10 and the shaft to which it is to be secured.

It will be clear from the foregoing description that the clampable precision gear of the invention has a number of distinct advantages when compared to the clamp-type gear. The size of the collar or hub 11 is much smaller than that of a gear requiring a hub clamp and, in fact, is comparable to that of the pin-type gear. Furthermore, the unit has a much lesser weight and moment of inertia, due to the absence of the clamp which has a center of gravity further displaced from the axis of rotation. This is of particular advantage in precision instruments. The device is also substantially balanced dynamically, since the clamping screw 15 is of relatively light weight and approximately equal to that of the metal removed in drilling and tapping the holes for the screw. Furthermore, the screw 15 has a very short moment arm and correspondingly low moment of inertia.

The large ratio of the length of the unit to the diameter of the shaft, due to the fact that the full length of the unit is utilized for axial guidance, ensures accurate axial alignment between the gear and its shaft. Furthermore, since the only portion of the unit which must be deflected is that portion between the radial slots 12 and 13, and the deflection is of an element which is straight transverse to the direction of deflection, the sleeve 11 may have a radial thickness substantially greater than that of the clamp-type gear in which the sectors of the hub must be deflected radially rather than peripherally. Because of this factor, the precision gear of the invention has a strength and a rigidity, that is resistance to deformation, many times those of the clamp-type gear.

Furthermore, the angular setting of the device of the invention on the shaft is completely uncritical, in contrast to the clamp-type gear where the clamping effect varies with the relative positions of the clamp and the hub slots. If desired, after the gear of the invention has been adjusted and set in the proper position, the collar and shaft can be drilled and pinned to secure them rigidly together. This avoids the difficulties frequently encountered when assembling a prototype gear train utilizing clamp-type gears to be replaced in production by pin-type gears having radically different weights, moments of inertia, rigidity, etc. Since the clamping element is integral with the gear itself, there is no possibility that it may be inadvertently omitted during the assembly process. Further, the gear 10 may be hobbed with the collar 11 clamped directly to an arbor identical to the shaft on which the gear is to be worked and, in fact, two of such gears can be arranged on this arbor back-to-back and hobbed concurrently. Since the gear is hobbed in the same clamped condition in which it is used in the final assembly, any errors in mounting tend to be self-compensating. In addition, when applied to bevel gearing, the shaft collar of the invention presents a smooth unslotted end surface which can serve as a thrust bearing to receive the axial forces inherent in such bevel gearing.

While there has been described what is, at present, considered to be the preferred embodiment of the invention, it will be obvious to those skilled in the art that various changes and modifications may be made therein without departing from the invention, and it is, therefore, aimed in the appended claim to cover all such changes and modifications as fall within the true spirit and scope of the invention.

What is claimed is:

A precision gear clampable in any desired angular position on a supporting shaft comprising:

(a) a gear body and a cylindrical collar integral therewith;
(b) a continuous bore extending through said body and said collar;
(c) two longitudinally spaced transverse radial slots through a substantial portion of said collar, one adjacent said gear body;
(d) a longitudinal second slot through at least a portion of said collar and lying substantially in an axial plane thereof, said second slot extending between and intersecting said radial slots;
(e) and a clamping screw passing through a portion of said collar on one side of said longitudinal slot and threaded into a portion of said collar on the opposite side thereof for drawing together portions of said collar on opposite sides of said longitudinal slot.

References Cited in the file of this patent

UNITED STATES PATENTS

| | | |
|---|---|---|
| 279,576 | Leaycraft | June 19, 1883 |
| 1,103,479 | Brown | July 14, 1914 |
| 2,312,760 | Heidegger | Mar. 2, 1943 |
| 2,395,169 | Crane et al. | Feb. 19, 1946 |
| 2,564,019 | Martin | Aug. 14, 1951 |
| 2,827,316 | Duffy | Mar. 18, 1958 |
| 2,934,803 | Allen | May 3, 1960 |
| 2,986,416 | Firth | May 30, 1961 |